US011367157B2

(12) United States Patent
Yang (10) Patent No.: US 11,367,157 B2
(45) Date of Patent: Jun. 21, 2022

(54) AIRCRAFT DISPATCH RELIABILITY RATE

(71) Applicant: THE BOEING COMPANY, Chicago, IL (US)

(72) Inventor: Minghui Yang, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 209 days.

(21) Appl. No.: 16/431,365

(22) Filed: Jun. 4, 2019

(65) Prior Publication Data

US 2020/0387996 A1 Dec. 10, 2020

(51) Int. Cl.
*G06Q 50/28* (2012.01)
*G06Q 10/06* (2012.01)

(52) U.S. Cl.
CPC ....... *G06Q 50/28* (2013.01); *G06Q 10/06315* (2013.01); *G06Q 10/06393* (2013.01)

(58) Field of Classification Search
CPC .................................................. G06Q 50/28
See application file for complete search history.

(56) References Cited

U.S. PATENT DOCUMENTS

| | | | | |
|---|---|---|---|---|
| 2003/0139875 A1* | 7/2003 | Baiada | ................. | G08G 5/0043 701/120 |
| 2005/0004919 A1* | 1/2005 | Green | ................. | G06Q 10/087 |
| 2008/0154458 A1* | 6/2008 | Brandstetter | .......... | G06Q 10/06 701/29.3 |
| 2009/0171557 A1* | 7/2009 | Brozat | ............... | G06Q 10/0633 701/120 |
| 2017/0323274 A1* | 11/2017 | Johnson | ............. | G05B 23/0251 |
| 2017/0323403 A1* | 11/2017 | Johnson | ................ | G06Q 50/14 |
| 2018/0047224 A1* | 2/2018 | Clark, IV | ............... | G07C 5/008 |

OTHER PUBLICATIONS

"Forum for Enhanced Reliability and Maintainability Standards (FERMS)," National Business Aviation Association, downloaded May 20, 2019, 6 pgs.

* cited by examiner

*Primary Examiner* — Kurtis Gills
(74) *Attorney, Agent, or Firm* — Moore Intellectual Property, PLLC (57) ABSTRACT

An automated method of moving aircraft parts between facilities includes determining a dispatch reliability rate associated with a group of aircraft parts. The dispatch reliability rate indicates a percentage of incoming flights meeting departure demands at a first facility, and the departure demands are based on the group of aircraft parts. The automated method also includes comparing the dispatch reliability rate to a dispatch reliability rate threshold associated with the group of aircraft parts to generate comparison data. The automated method further includes determining to adjust a stock level of at least one aircraft part of the group of aircraft parts at the first facility based on the comparison data. The automated method further includes moving a quantity of the at least one aircraft part between the first facility and a second facility to adjust the stock level of the at least one aircraft part at the first facility.

20 Claims, 3 Drawing Sheets

AIRCRAFT DISPATCH RELIABILITY RATE

FIELD OF THE DISCLOSURE

The present disclosure is related to a dispatch reliability rate.

BACKGROUND

Different aircraft parts can be stored at an airport. The aircraft parts can be used by a ground crew and by aircraft technicians to perform maintenance on incoming aircrafts arriving at the airport. The maintenance is performed between the time the incoming aircrafts arrive (e.g., land) and the subsequent take-off times. If performing maintenance for a particular aircraft requires a particular aircraft part, a subsequent take-off time for the particular aircraft can be delayed if the particular aircraft part is not stored at the airport. As a result, dispatch reliability rates are lowered and certain contractual obligations can be missed.

SUMMARY

According to one implementation of the present disclosure, an automated method of moving aircraft parts between facilities includes determining a dispatch reliability rate associated with a group of aircraft parts. The dispatch reliability rate indicates a percentage of incoming flights meeting departure demands at a first facility, and the departure demands are based on the group of aircraft parts. The automated method also includes comparing the dispatch reliability rate to a dispatch reliability rate threshold associated with the group of aircraft parts to generate comparison data. The automated method further includes determining to adjust a stock level of at least one aircraft part of the group of aircraft parts at the first facility based on the comparison data. The automated method further includes moving a quantity of the at least one aircraft part between the first facility and a second facility to adjust the stock level of the at least one aircraft part at the first facility.

According to another implementation of the present disclosure, a computer-readable storage device stores instructions that, when executed by a processor, cause the processor to perform operations that includes determining a dispatch reliability rate associated with a group of aircraft parts. The dispatch reliability rate indicates a percentage of incoming flights meeting departure demands at a first facility, and the departure demands are based on the group of aircraft parts. The operations also include comparing the dispatch reliability rate to a dispatch reliability rate threshold associated with the group of aircraft parts to generate comparison data. The operations further include determining to adjust a stock level of at least one aircraft part of the group of aircraft parts at the first facility based on the comparison data. The operations further include initiating movement of a quantity of the at least one aircraft part between the first facility and a second facility to adjust the stock level of the at least one aircraft part at the first facility.

One advantage of the above-described implementations is improved management of different aircraft parts at a facility (e.g., an airport) to ensure a target dispatch reliability rate is achieved while reducing costs associated with overstocking aircraft parts at the facility. As used herein, a "dispatch reliability rate" indicates a percentage of incoming flights meeting departure demands at the facility. The departure demands are based on the availability of aircraft parts at the facility to ensure on-time departures. In some scenarios, the target dispatch reliability rate is a contractual rate that an airline aims to satisfy. Thus, the above-described techniques enable a dispatch reliability apparatus to identify a quantity of aircraft parts to be moved between the facility and a remote facility (e.g., an airline hub airport or a remote storage facility) to ensure that the facility has enough aircraft parts on-hand (so that a dispatch reliability rate at the first facility satisfies the target dispatch reliability rate) and to ensure that the facility does not have too many excess aircraft parts for cost saving and storage saving purposes. Additionally, the features, functions, and advantages that have been described can be achieved independently in various implementations or may be combined in yet other implementations, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple aircraft parts are illustrated and associated with reference numbers 150A, 150B, etc. When referring to a particular one of these aircraft parts, such as the first aircraft part 150A, the distinguishing letter "A" is used. However, when referring to any arbitrary one of these aircraft parts or to these aircraft parts as a group, the reference number 150 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1:
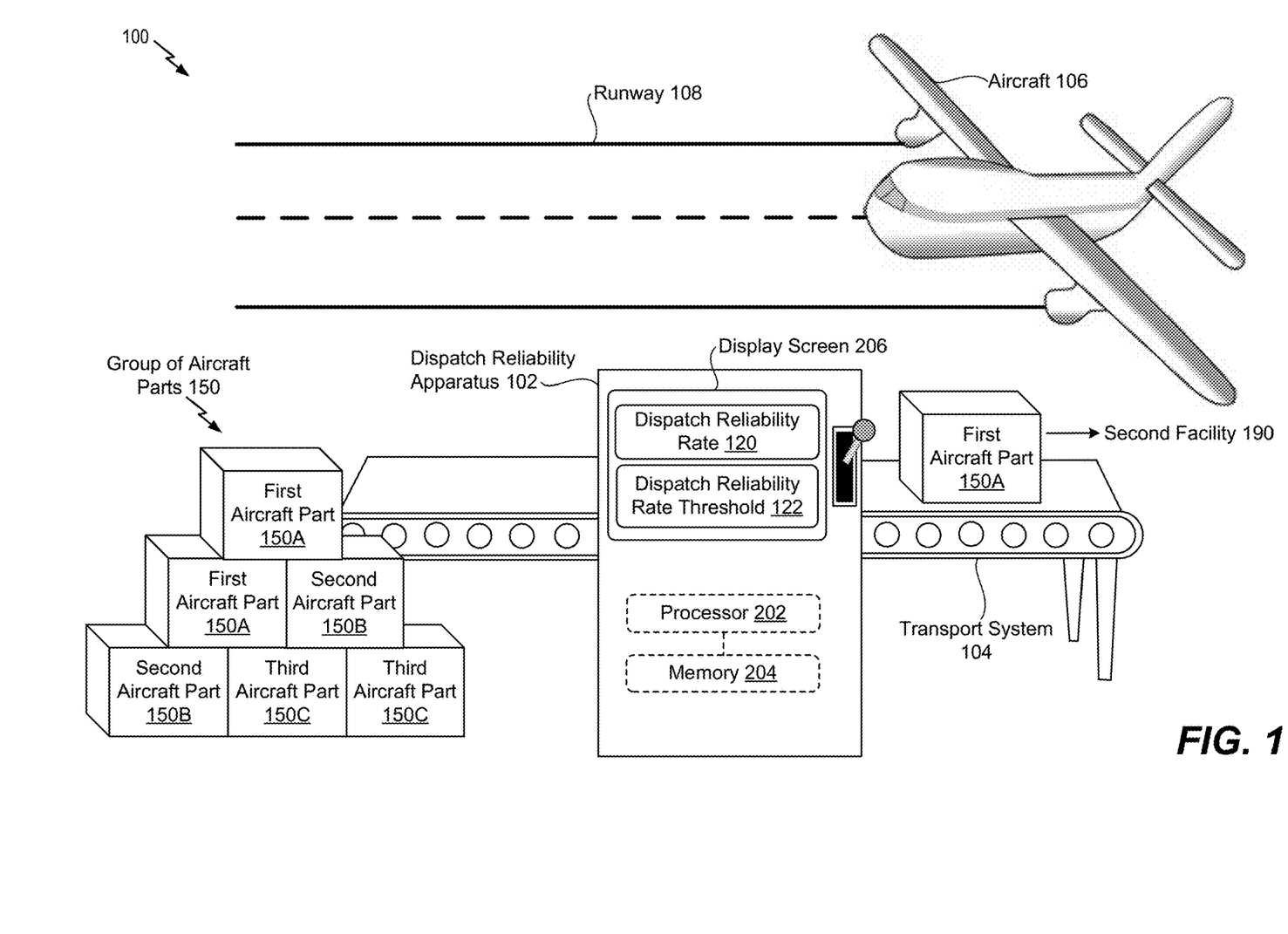
FIG. 1 is a diagram of an example of a facility having a dispatch reliability apparatus that is operable to move aircraft parts to ensure a target dispatch reliability rate is achieved while reducing costs associated with overstocking aircraft parts.

FIG. 1 is an illustration of a facility 100 having a dispatch reliability apparatus that is operable to move aircraft parts to ensure a target dispatch reliability rate is achieved while reducing costs associated with overstocking aircraft parts. For example, a dispatch reliability apparatus 102 is located at the facility 100. As illustrated in FIG. 1, the facility 100 includes an airport. For example, the facility 100 includes a runway 108 on which one or more aircrafts 106 can use to land or take-off.

A group of aircraft parts 150 is stored at the facility 100. According to one implementation, each aircraft part 150 in the group of aircraft parts 150 can be used for repair operations or maintenance operations on the aircraft 106 landing at the facility 100 prior to the scheduled departure time for the aircraft 106 to leave the facility 100. To illustrate, if the aircraft 106 lands at the facility 100 at 12:00 P.M. and has a scheduled take-off time at 4:00 P.M., a ground crew at the facility 100 has approximately four hours to ensure that the aircraft 106 is in condition for take-off. During those four hours, the ground crew can use aircraft parts 150 to perform repair operations or maintenance operations on the aircraft 106.

The group of aircraft parts 150 includes a first aircraft part 150A, a second aircraft part 150B, and a third aircraft part 150C. According to one implementation, the first aircraft part 150A can include a landing gear, the second aircraft part 150B can include a nose gear, and the third aircraft part 150C can include a hydraulic pump. It should be understood that the above-described parts are merely non-limiting examples of the aircraft parts 150 and should not be construed as limiting. Although three different aircraft parts 150A-150C are illustrated in FIG. 1, in other implementations, additional (or fewer) aircraft parts 150 can be stored at the facility 100. As a non-limiting example, forty-five different aircraft parts 150 can be stored at the facility 100. In some implementations, some of the aircraft parts 150 stored at the facility 100 as described herein can be a "departure critical aircraft parts." As a non-limiting example, each aircraft part 150 stored at the facility 100 can corresponds to a part that has to operate at a particular level of efficiency defined by industry regulations in order for the aircraft 106 to be cleared for take-off.

The facility 100 can store a certain amount of inventory of each aircraft part 150. For example, as illustrated in FIG. 1, three of the first aircraft parts 150A are stored at the facility 100, two of the second aircraft parts 150B are stored at the facility 100, and two of the third aircraft parts 150C are stored at the facility 100. The dispatch reliability apparatus 102 is configured to determine whether to move a quantity of a particular aircraft 150 between the facility 100 and a second facility 190. As used herein, the second facility 190 can include an airline hub airport or a remote storage facility. For example, the second facility 190 can be used to cost-efficiently store a plurality of the aircraft parts 150 such that storage costs at the facility 100 are reduced. As described below, the determination of whether the move a quantity of a particular aircraft 150 between the facility and the second facility 190 can be based on a dispatch reliability rate 120, a fill rate for a particular aircraft part 150, or both.

Figure 2:
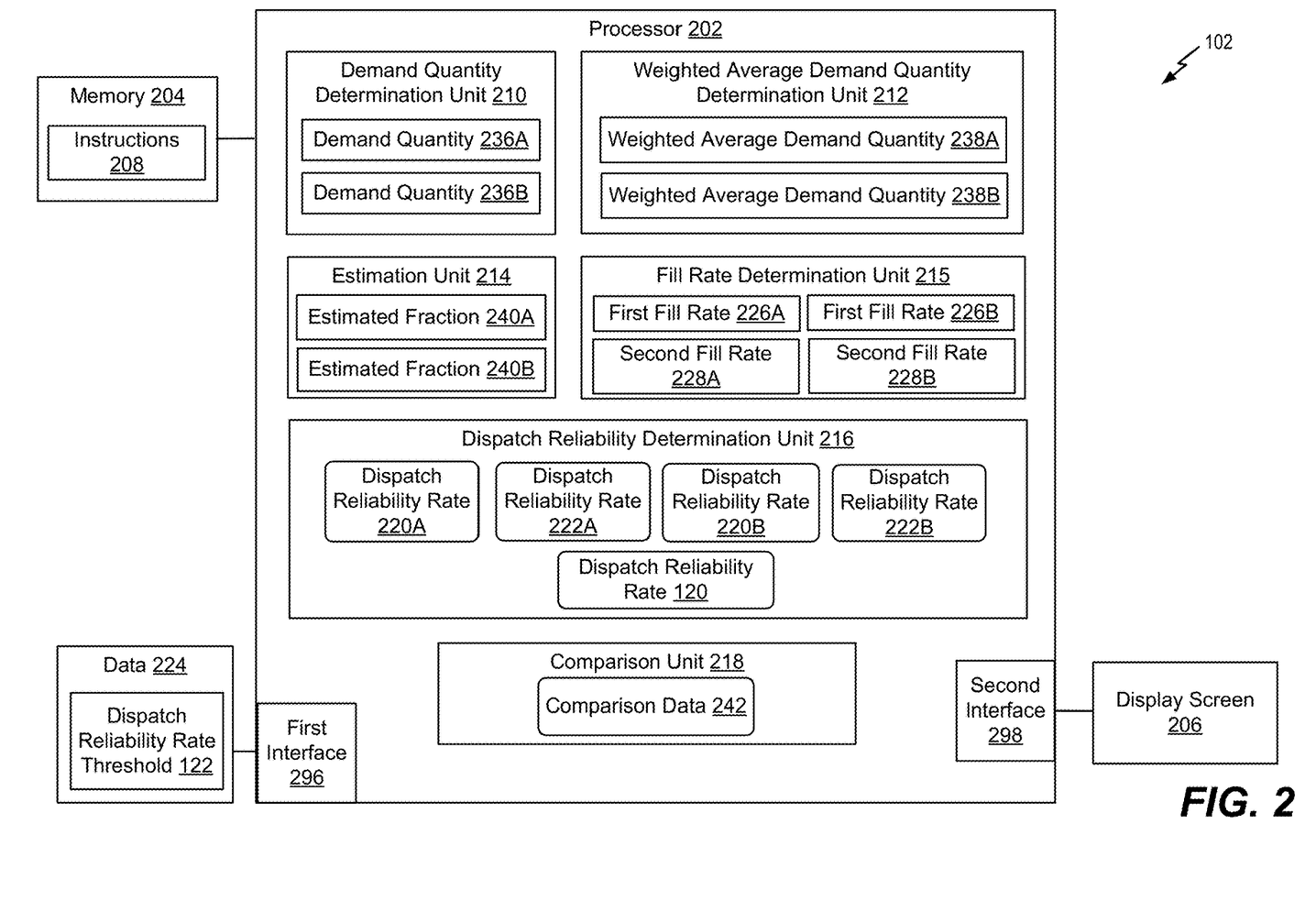
FIG. 2 is a diagram of an example of the dispatch reliability apparatus.

The dispatch reliability apparatus 102 includes a processor 202 that is coupled to a memory 204. The memory 204 is a non-transitory computer-readable storage device that includes instructions that are executable by the processor 202. Additional detail describing the operations of the processor 202 and the memory 204 are described with respect to FIG. 2. The dispatch reliability apparatus 102 also includes a display screen 206 that is configured to display different data. In the example of FIG. 2, the display screen 206 displays the dispatch reliability rate 120 and a dispatch reliability rate threshold 122, which is described below.

The processor 202 is configured to determine the dispatch reliability rate 120 associated with the group of aircraft parts 150. As used herein, the dispatch reliability rate 120 indicates a percentage of incoming flights that meet departure demands at the facility 100. As a non-limiting example, if for every one-thousand aircrafts 106 that land at the facility 100, nine hundred and ninety of those aircrafts 106 are able to take-off on time because the departure demands have been met, the dispatch reliability rate 120 is equal to ninety-nine percent. The departure demands are based on the group of aircraft parts 150. For example, if a particular aircraft 106 lands at the facility 100 and it is determined that the first aircraft part 150A on the particular aircraft 106 has to be replaced prior to the particular aircraft 106 taking off, the particular aircraft 106 has a high likelihood of taking off on time if the first aircraft part 150A is in stock at the facility 100. As a result, the dispatch reliability rate 120 will not be negatively affected (e.g., lowered) because the first aircraft part 150A is "on-hand" when the particular aircraft 106 lands at the facility 100. However, if the first aircraft part 150A is not on-hand when the particular aircraft 106 lands, the dispatch reliability rate 120 can be negatively affected.

The processor 202 is also configured to compare the dispatch reliability rate 120 to the dispatch reliability rate threshold 122 associated with the group of aircraft parts 150 to generate comparison data. Based on the comparison data, the processor 202 can determine to adjust a stock level of at least one aircraft part 150 of the group aircraft parts 150. To illustrate, if the dispatch reliability rate 120 is greater than the dispatch reliability rate threshold 122, the processor 202 can determine to reduce the stock level of at least one aircraft part 150 of the group of aircraft parts 150. As a non-limiting example, the processor 202 can instruct a transport system 104 to move one or more of the first aircraft parts 150A to the second facility 190 to reduce the stock level of the first aircraft part 150A at the facility 100. Reducing the stock level of the first aircraft part 150A at the facility 100 can reduce storage costs at the facility 100. However, if the dispatch reliability rate 120 is less than the dispatch reliability rate threshold 122, the processor 202 can determine to increase the stock level of at least one aircraft part 150 of the group of aircraft parts 150. As a non-limiting example, the processor 202 can instruct the transport system 104 to move one or more of the first aircraft parts 150A from second facility 190 to the facility 100. Increasing the stock level of the first aircraft part 150A at the facility 100 can improve (e.g., increase) the dispatch reliability rate 120.

The techniques described with respect to FIG. 1 enable improved management of stock levels of different aircraft parts 150 at the facility 100 to ensure a target dispatch reliability rate (e.g., the dispatch reliability rate threshold 122) is achieved while reducing costs associated with overstocking aircraft parts 150 at the facility 100. Thus, the above-described techniques enable the dispatch reliability apparatus 102 to move a quantity of aircraft parts 150 between the facility 100 and the second facility 190 to ensure that the facility 100 has enough aircraft parts 150 on-hand (so that the dispatch reliability rate 120 at the facility 100 satisfies the dispatch reliability rate threshold 122) and to ensure that the facility 100 does not have too many excess aircraft parts 150 for cost saving and storage saving purposes.

FIG. 2 is a diagram of the dispatch reliability apparatus 102. The dispatch reliability apparatus 102 includes the processor 202 and the memory 204. The memory 204 includes instructions 208 that are executable by the processor 202 to perform the operations described herein. As illustrated in FIG. 2, data 224 can be provided to the processor 202 via a first interface 296, and the display screen 206 is coupled to the processor 202 via a second interface 298. The processor 202 includes a demand quantity determination unit 210, a weighted average demand quantity determination unit 212, an estimation unit 214, a fill rate determination unit 215, a dispatch reliability determination unit 216, and a comparison unit 218. Each of the units 210-218 can be implemented using application-specific integrated circuits (e.g., ASICs), a programmable circuit (e.g., the processor 202 the configured to execute software), a firmware device, or a combination thereof.

The dispatch reliability apparatus 102 described with respect to FIG. 2 is configured to determine the dispatch reliability rate 120. For ease of description, the determination of the dispatch reliability rate 120 is based on statistics associated with the first aircraft part 150A and the second aircraft part 150B. However, it should be understood that the techniques described with respect to FIG. 2 can also be applied to statistics associated with additional aircraft parts, such as the third aircraft part 150C.

The demand quantity determination unit 210 is configured to determine a demand quantity 236A for the first aircraft part 150A for a total number of incoming flights arriving at the facility 100 within a time span. As a non-limiting example, among ten thousand incoming flights that arrived at the facility 100 within a year, one flight demanded a quantity of one for the first aircraft part 150A prior to taking off, another flight demanded a quantity of one for the first aircraft part 150A prior to taking off, another flight demanded a quantity of two for the first aircraft part 150A prior to taking off, another flight demanded a quantity of one for the first aircraft part 150A, and the remaining flights did not demand any first aircraft parts 150A. As a result, the demand quantity 236A for the first aircraft part 150A is equal to five (e.g., 1+1+2+1=5). The demand quantity determination unit 210 can determine the demand quantity 236A by updating or tracking the demands for the first aircraft part 150A in real-time.

In a similar manner, the demand quantity determination unit 210 is configured to determine a demand quantity 236B for the second aircraft part 150B for the total number of incoming flights arriving at the facility within the time span. As a non-limiting example, among the ten thousand incoming flights that arrived at the facility 100 with the year, one flight demanded a quantity of one for the second aircraft part 150B prior to taking off, another flight demanded a quantity of one for the second aircraft part 150B prior to taking off, another flight demanded a quantity of two for the second aircraft part 150B prior to taking off, and the remaining flights did not demand any second aircraft parts 150B. As a result, the demand quantity 236B for the second aircraft part 150B is equal to four (e.g., 1+1+2=4). The demand quantity determination unit 210 can determine the demand quantity 236B by updating or tracking the demands for the second aircraft part 150B in real-time.

The weighted average demand quantity determination unit 212 is configured to determine a weighted average demand quantity 238A for the first aircraft part 150A. The weighted average demand quantity 238A is based on the demand quantity 236A and a number of incoming flights that demanded the first aircraft part 150A. According to the example described above, the demand quantity 236A is equal to five and the number of incoming flights that demanded the first aircraft part 150A is equal to four. As a result, the weighted average demand quantity 238A for the first aircraft part 150A is equal to 1.25 (e.g., 5/4=1.25). The weighted average demand quantity determination unit 212 is also configured to determine a weighted average demand quantity 238B for the second aircraft part 150B. The weighted average demand quantity 238B is based on the demand quantity 236B and a number of incoming flights that demanded the second aircraft part 150B. According to the example described above, the demand quantity 236B is equal to four and the number of incoming flights that demanded the second aircraft part 150B is equal to three. As a result, the weighted average demand quantity 238B for the second aircraft part 150B is equal to 1.33 (e.g., 4/3=1.33)

The estimation unit 214 is configured to estimate a fraction 240A of incoming flights projected to demand the first aircraft part 150A based on the demand quantity 236A, the weighted average demand quantity 238A, and the total number of incoming flights. For example, the estimation unit 214 can estimate the fraction 240A using the expression $R_A=D_A/X_A/L$, where $R_A$ corresponds to the estimated fraction 240A, $D_A$ corresponds to demand quantity 236A, $X_A$ corresponds to the weighted average demand quantity 238A, and L corresponds to the total number of incoming flights (e.g., ten thousand). Thus, the estimated fraction ($R_A$) 240A is equal to 0.0004 (e.g., 5/1.25/10000). The estimation unit 214 is also configured to estimate a fraction 240B of incoming flights projected to demand the second aircraft part 150B based on the demand quantity 236B, the weighted average demand quantity 238B, and the total number of incoming flights. For example, the estimation unit 214 can estimate the fraction 240B using the expression $R_B=D_B/X_B/L$, where $R_B$ corresponds to the estimated fraction 240B, $D_B$ corresponds to demand quantity 236B, $X_B$ corresponds to the weighted average demand quantity 238B, and L corresponds to the total number of incoming flights (e.g., ten thousand). Thus, the estimated fraction ($R_B$) 240B is equal to 0.0003 (e.g., 4/1.33/10000).

The fill rate determination unit 215 is configured to determine different fill rates 226A, 228A associated with the first aircraft part 150A and different fill rates 226B, 226B associated with the second aircraft part 150B. The fill rates 226, 228 indicate a rate at which demands for a particular quantity of a particular aircraft part 150 is timely met. Partially meeting a demand does not correspond to a partial credit for the fill rate. For example, if there is a demand for two of the first aircraft parts 150A and the facility 100 has only one of the first aircraft parts 150A, there is a fill rate failure instead of a fifty percent fill rate. However, if the first aircraft part 150A is delivered on time according to a contract, it should not be considered a fill rate failure. The fill rate determination unit 215 can determine the fill rates 226, 228 by updating or tracking in real-time whether demands for particular aircraft parts 150 are timely met.

In the implementation of FIG. 2, a first fill rate 226A associated with the first aircraft part 150A indicates a percentage of time that a demand for a single first aircraft part 150A is timely met, and a second fill rate 228A associated with the first aircraft part 150A indicates a percentage of time that a demand for two first aircraft parts 150A is timely met. Thus, different aircraft parts 150 can have different fill rates based on the quantity of the part demanded. For ease of description, as described herein, the first fill rate 226A is 98% and the second fill rate 228A is 94%. In a similar manner, a first fill rate 226B associated with the second aircraft part 150B indicates a percentage of time that a demand for a single second aircraft part 150B is timely met, and a second fill rate 228B associated with the second aircraft part 150B indicates a percentage of time that a demand for two second aircraft parts 150B is timely met. For ease of description, as described herein, the first fill rate 226B is 99% and the second fill rate 228B is 95%.

The dispatch reliability determination unit 216 is configured to determine dispatch reliability rates associated with the aircraft parts 150 based on corresponding estimated fractions 240 and fill rates 226, 228. To illustrate, the dispatch reliability determination unit 216 is configured to determine a dispatch reliability rate 220A associated with the first aircraft part 150A based on the estimate fraction 240A and the first fill rate 226A. The dispatch reliability determination unit 216 can determine the dispatch reliability rate 220A using the expression $DR_{A1}=1-R_A*[1-f(A,q_{A1})]$, where $DR_{A1}$ corresponds to the dispatch reliability rate 220A, and where $f(A,q_{A1})$ corresponds to the fill rate 226A of the first aircraft part 150A (e.g., "A") when the demand quantity ($q_{A1}$) is equal to one. Thus, the dispatch reliability rate 220A is equal to 99.9992% (e.g., 1−0.0004*(1−0.98)).

The dispatch reliability determination unit 216 is also configured to determine a dispatch reliability rate 222A associated with the first aircraft part 150A based on the estimate fraction 240A and the second fill rate 228A. The dispatch reliability determination unit 216 can determine the dispatch reliability rate 222A using the expression $DR_{A2}=1-R_A*[1-f(A,q_{A2})]$, where $DR_{A2}$ corresponds to the dispatch reliability rate 222A, and where $f(A,q_{A2})$ corresponds to the fill rate 228A of the first aircraft part 150A (e.g., "A") when the demand quantity ($q_{A2}$) is equal to two. Thus, the dispatch reliability rate 222A is equal to 99.9976% (e.g., 1−0.0004*(1−0.94)).

The dispatch reliability determination unit 216 is also configured to determine a dispatch reliability rate 220B associated with the second aircraft part 150B based on the estimate fraction 240B and the first fill rate 226B. The dispatch reliability determination unit 216 can determine the dispatch reliability rate 220B using the expression $DR_{B1}=1-R_B*[1-f(B,q_{B1})]$, where $DR_{B1}$ corresponds to the dispatch reliability rate 220B, and where $f(B,q_{B1})$ corresponds to the fill rate 226B of the second aircraft part 150B (e.g., "B") when the demand quantity ($q_{B1}$) is equal to one. Thus, the dispatch reliability rate 220B is equal to 99.9997% (e.g., 1−0.0003*(1−0.99)). The dispatch reliability determination unit 216 is also configured to determine a dispatch reliability rate 222B associated with the second aircraft part 150B based on the estimate fraction 240B and the second fill rate 228B. The dispatch reliability determination unit 216 can determine the dispatch reliability rate 222B using the expression $DR_{B2}=1-R_B*[1-f(B,q_{B2})]$, where $DR_{B2}$ corresponds to the dispatch reliability rate 222B, and where $f(B,q_{B2})$ corresponds to the fill rate 228B of the second aircraft part 150B (e.g., "B") when the demand quantity ($q_{B2}$) is equal to two. Thus, the dispatch reliability rate 222B is equal to 99.9991% (e.g., 1−0.0003*(1−0.97)).

Based on the dispatch reliability rates 220, 222, the dispatch reliability determination unit 216 is configured to determine the dispatch reliability rate 120 associated with the group of parts 150. For example, the dispatch reliability determination unit 216 can determine the dispatch reliability rate 120 using the expression $DR=DR_{A1}*DR_{A2}*DR_{B1}*DR_{B2}$, where DR corresponds to the dispatch reliability rate 120. Thus, the dispatch reliability rate 120 is equal to 99.9956% (e.g., 0.999992*0.999976*0.999997*0.999991).

The comparison unit 218 is configured to compare the dispatch reliability rate 120 to the dispatch reliability rate threshold 122 associated the group of aircraft parts 150 to generate comparison data 242. The dispatch reliability rate threshold 122 is included in the data 224 provided to the processor 202 via the first interface 296. In some implementations, the dispatch reliability rate threshold 122 is a contractual rate with an airline, contractual rate with a part supplier, or a contractual rate with the facility 100. The processor 202 is configured to determine to adjust a stock level of a particular aircraft part 150 of the group of aircraft parts 150 at the facility 100 based on the comparison data 242. For example, if the comparison data 242 indicates that the dispatch reliability rate 120 satisfies (e.g., is greater than) the dispatch reliability rate threshold 122, the processor 202 determines to adjust the stock level of the particular aircraft part 150 by moving a quantity of the particular aircraft part 150 from the facility 100 to the second facility 190. As a result, fewer aircraft parts 150 are stored at the facility 100 to reduce storage costs. If the comparison data 242 indicates that the dispatch reliability rate 120 fails to satisfy (e.g., is less than) the dispatch reliability rate threshold 122, the processor 202 determines to adjust the stock level of the particular aircraft part 150 by moving a quantity of the particular aircraft part 150 from the second facility 190 to the facility 100. As a result, the facility 100 may have increased stock levels of particular aircraft part 150 to ensure dispatch reliability rate threshold 122 is satisfied.

The determination of which aircraft part 150 to move can be based on which aircraft part 150 has the greatest (e.g., largest) impact to the dispatch reliability rate 120. According to one implementation, the determination of which aircraft part has the greatest impact to the dispatch reliability rate 120 is based on changes in fill rates associated with different aircraft parts. For example, the fill rate determination unit 215 is configured to determine a change in fill rate ($\Delta f_A$) associated with the first aircraft part 150A based on the first fill rate 226A and the second fill rate 228A. For example, the change in fill rate ($\Delta f_A$) associated with the first aircraft part 150A is equal to 0.04 (e.g., 0.98–0.94). The fill rate determination unit 215 is also configured to determine a change in fill rate ($\Delta f_B$) associated with the second aircraft part 150B based on the first fill rate 226B and the second fill rate 228B. For example, the change in fill rate ($\Delta f_B$) associated with the second aircraft part 150B is equal to 0.02 (e.g., 0.99–0.97). Based on the change in fill rate ($\Delta f_A$) associated with the first aircraft part 150A and the change in fill rate ($\Delta f_B$) associated with the second aircraft part 150B, the processor 202 is configured to identify the particular aircraft part 150 of the group of aircraft parts 150 that has a greatest impact to the dispatch reliability rate 120. For example, because the change in fill rate ($\Delta f_A$) associated with the first aircraft part 150A is greater than the change in fill rate ($\Delta f_B$) associated with the second aircraft part 150B, the processor 202 can determine that the first aircraft part 150A has a greatest impact to the dispatch reliability rate 120. Therefore, the processor 202 can determine to move the first aircraft part 150A between facilities based on the dispatch reliability rate 120.

According to another implementation, the determination on which aircraft part has the greatest impact to the dispatch reliability rate 120 is based on changes in dispatch reliability rates associated with different aircraft parts. For example, the dispatch reliability determination unit 216 is configured to determine a change in dispatch reliability rate ($\Delta DR_A$) associated with the first aircraft part 150A based on the dispatch reliability rate 120, the change in fill rate ($\Delta f_A$) associated with the first aircraft part 150A, and the fill rate 226A. To illustrate, the dispatch reliability determination unit 216 can determine the change in dispatch reliability rate ($\Delta DR_A$) using the expression $\Delta DR_A = DR * \Delta p_A / p_A$, where $\Delta p_A$ corresponds to the change in dispatch reliability rate associated with the first aircraft part 150A for the different fill rates (e.g., 0.999992–0.999976), and where $p_A$ corresponds to the dispatch reliability rate 220A. Thus, the change in dispatch reliability rate ($\Delta DR_A$) associated with the first aircraft part 150A is equal to 0.0015999% (e.g., 0.999956*0.000016/0.999992). The dispatch reliability determination unit 216 is also configured to determine a change in dispatch reliability rate ($\Delta DR_B$) associated with the second aircraft part 150B based on the dispatch reliability rate 120, the change in fill rate ($\Delta f_B$) associated with the second aircraft part 150B, and the fill rate 226B. To illustrate, the dispatch reliability determination unit 216 can determine the change in dispatch reliability rate ($\Delta DR_B$) using the expression $\Delta DR_B = DR * \Delta p_B / p_B$, where $\Delta p_B$ corresponds to the change in dispatch reliability rate associated with the second aircraft part 150B for the different fill rates (e.g., 0.999997–0.999991), and where $p_B$ corresponds to the dispatch reliability rate 220B. Thus, the change in dispatch reliability rate ($\Delta DR_B$) associated with the second aircraft part 150B is equal to 0.00059997% (e.g., 0.999956*0.000006/0.999997).

Based on the change in dispatch reliability rate ($\Delta DR_A$) associated with the first aircraft part 150A and the change in dispatch reliability rate ($\Delta DR_B$) associated with the second aircraft part 150B, the processor 202 is configured to identify the particular aircraft part 150 of the group of aircraft parts 150 that has a greatest impact to the dispatch reliability rate 120. For example, because the change in dispatch reliability rate ($\Delta DR_A$) associated with the first aircraft part 150A is greater than the change in dispatch reliability rate ($\Delta DR_B$) associated with the second aircraft part 150B, the processor 202 can determine that the first aircraft part 150A has the greatest impact to the dispatch reliability rate 120.

Thus, in the both of the above-described implementations, the first aircraft part 150A has the greatest impact to the dispatch reliability rate 120. As a result, the first aircraft part 150A is moved between facilities 100, 190 based on the comparison data 242. For example, the processor 202 can initiate movement of the first aircraft part 150A to the second facility 190 in response to a determination that the comparison data 242 indicates the dispatch reliability rate 120 satisfies the dispatch reliability rate threshold 122. Initiating movement of a quantity of the first aircraft part 150A to the second facility 190 can include generating a command that instructs the transport system 104 to transport a quantity of the first aircraft part 150A to the second facility 190. The processor 202 can initiate movement of the first aircraft part 150A (from the second facility 190) to the facility 100 in response to a determination that the comparison data 242 indicates the dispatch reliability rate 120 fails to satisfy the dispatch reliability rate threshold 122. Initiating movement of a quantity of the first aircraft part 150A to the facility 100 can include generating a command that instructs the transport system 104 to transport a quantity of the first aircraft part 150A (from the second facility 190) to the facility 100.

The dispatch reliability apparatus 102 enables improved management of stock levels of different aircraft parts 150 at the facility 100 to ensure a target dispatch reliability rate (e.g., the dispatch reliability rate threshold 122) is achieved while reducing costs associated with overstocking aircraft parts 150 at the facility 100. Thus, the above-described techniques enable the dispatch reliability apparatus 102 to move a quantity of aircraft parts 150 between the facility 100 and the second facility 190 to ensure that the facility 100 has enough aircraft parts 150 on-hand (so that the dispatch reliability rate 120 at the facility 100 satisfies the dispatch reliability rate threshold 122) and to ensure that the facility 100 does not have too many excess aircraft parts 150 for cost saving and storage saving purposes.

Figure 3:
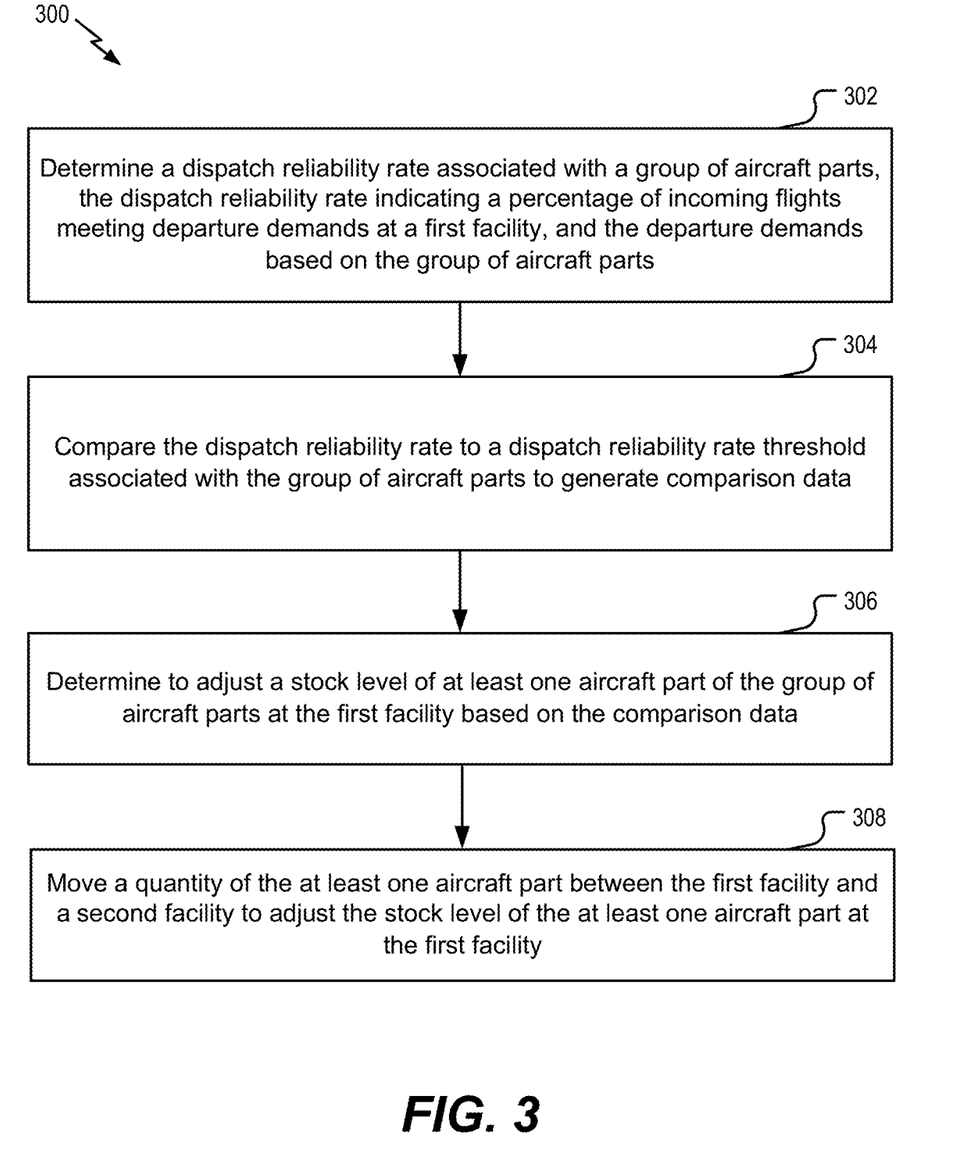
FIG. 3 is a flowchart of a method of moving aircraft parts between facilities.

FIG. 3 is a flowchart of a method 300 of moving aircraft parts between facilities. In an illustrative example, the method 300 is performed by the dispatch reliability apparatus 102 and the transport system 104.

The method 300 includes determining a dispatch reliability rate associated with a group of aircraft parts, at 302. The dispatch reliability rate indicates a percentage of incoming flights meeting departure demands at a first facility, and the departure demands are based on the group of aircraft parts. For example, the dispatch reliability determination unit 216 determines the dispatch reliability rate 120 associated with the group of aircraft parts 150. The dispatch reliability rate 120 indicates the percentage of incoming flights meeting departure demands at the facility 100, and the departure demands are based on the group of aircraft parts 150.

According to one implementation, the method 300 includes determining a particular dispatch reliability rate associated with the at least one aircraft part by determining a total demand quantity for the at least one aircraft part for a total number of incoming flights arriving at the first facility within a time span. For example, the demand quantity determination unit 210 can determine the demand quantity 236A for the first aircraft part 150A. Determining the particular dispatch reliability rate can also include determining a weighted average demand quantity for the at least one aircraft part. The weighted average demand quantity is based on the total demand quantity and a number of incoming flights that demanded the at least one aircraft part. For example, the weighted average demand quantity determination unit 212 can determine the weighted average demand quantity 238A for the first aircraft part 150A. Determining the particular dispatch reliability rate can also include estimating a fraction of incoming flights projected to demand the at least one aircraft part based on the total demand quantity, the weighted average demand quantity, and the total number of incoming flights. For example, the estimation unit 214 can estimate the fraction 240A of incoming flights projected to demand the first aircraft part 150A. Determining the particular dispatch reliability rate can also include determining a fill rate associated with the at least one aircraft part at the first facility. For example, the fill rate determination unit 215 can determine the first fill rate 226A. The particular dispatch reliability rate is determined based on the fraction and the fill rate. For example, the dispatch reliability rate 220A for the first aircraft part 150A is based on the estimated fraction 240A and the first fill rate 226A.

The method 300 also includes comparing the dispatch reliability rate to a dispatch reliability rate threshold associated with the group of aircraft parts to generate comparison data, at 304. For example, the comparison unit 218 compares the dispatch reliability rate 120 to the dispatch reliability rate threshold 122 associated with the group of aircraft parts 150 to generate the comparison data 242.

The method 300 also includes determining to adjust a stock level of at least one aircraft part of the group of aircraft parts at the first facility based on the comparison data, at 306. For example, the processor 202 determines to adjust the stock level of the first aircraft part 150A at the facility 100 based on the comparison data 242.

The method 300 also includes moving a quantity of the at least one aircraft part between the first facility and a second facility to adjust the stock level of the at least one aircraft part at the first facility, at 306. For example, the transport system 104 moves the quantity of the first aircraft part 150A between the facility 100 and the second facility 190 to adjust the stock level of the first aircraft part 150A at the facility 100. According to one implementation, moving the quantity of the at least one aircraft part includes moving the quantity of the at least one aircraft part from the first facility to the second facility in response to a determination that the comparison data indicates the dispatch reliability rate satisfies the dispatch reliability rate threshold. According to another implementation, moving the quantity of the at least one aircraft part includes moving the quantity of the at least one aircraft part from the second facility to the first facility in response to a determination that the comparison data indicates the dispatch reliability rate fails to satisfy the dispatch reliability rate threshold.

According to one implementation, the method 300 includes determining a change in fill rate associated with the at least one aircraft part based on fill rate and a second fill rate associated with the at least one aircraft part. The second fill rate is based on a different demand than the fill rate. The method 300 can also include identifying, based on the change in the fill rate, a particular aircraft part of the group of aircraft parts that has a greatest impact to the dispatch reliability rate. The method 300 can also include moving the particular aircraft part between the first facility and the second facility to increase the likelihood that the dispatch reliability rate is in compliance with a target dispatch reliability rate.

According to one implementation, the method 300 includes determining a change in dispatch reliability rate associated with the at least one aircraft part based on the dispatch reliability rate, the change in fill rate, and the fill rate. The method 300 can also include identifying, based on the change in the dispatch reliability rate, the particular aircraft part that has the greatest impact to the dispatch reliability rate. The method 300 can also include determining the dispatch reliability rate based at least one the particular dispatch reliability rate associated with the at least one aircraft part and a second dispatch reliability rate associated with a second aircraft part.

According to one implementation, the method 300 includes determining the impact to the dispatch reliability rate based on the change in the particular dispatch reliability rate. The method 300 can also include identifying, based on the impact to the dispatch reliability rate, the particular aircraft part that has the greatest impact to the dispatch reliability rate.

According to one implementation, the method 300 can include identifying a particular aircraft part, from the group of aircraft parts, to move based on a highest part shortage rate. The part shortage rate for each aircraft part can be expressed as $S_i[1-f(i,q_i)]*D_i*W_t/C_i$, where $S_i$ corresponds to the part shortage rate, where $1-f(i,q_i)$ corresponds to the shortage rate, where $D_i$ corresponds to the annual demand, where $W_t$ corresponds to the weighted factor, and where $C_i$ corresponds to the part costs. According to another implementation, the method 300 can include identifying a particular aircraft part, from the group of aircraft parts, to move based on a largest dispatch rate ratio. The dispatch rate ratio can be expressed as $S_i=[1-p(i,q_i)]*W_t/[p(i,q_i)*C_i]$, where $S_i$ corresponds to the dispatch rate ratio, where $p(i,q_i)$ corresponds to dispatch reliability, where $W_t$ corresponds to the weighted factor, and where $C_i$ corresponds to the part costs.

The method 300 enables improved stock levels of different aircraft parts 150 at the facility 100 to ensure a target dispatch reliability rate (e.g., the dispatch reliability rate threshold 122) is achieved while reducing costs associated with overstocking aircraft parts 150 at the facility 100. Thus, method 300 enables the dispatch reliability apparatus 102 to move a quantity of aircraft parts 150 between the facility 100 and the second facility 190 to ensure that the facility 100 has enough aircraft parts 150 on-hand (so that the dispatch reliability rate 120 at the facility 100 satisfies the dispatch reliability rate threshold 122) and to ensure that the facility 100 does not have too many excess aircraft parts 150 for cost saving and storage saving purposes.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An automated method of moving aircraft parts between facilities, the automated method comprising:
   determining, at a dispatch reliability apparatus, a particular dispatch reliability rate associated with at least one aircraft part of a group of aircraft parts, determining the particular dispatch reliability rate comprising:
      determining a total demand quantity for the at least one aircraft part for a total number of incoming flights that have previously arrived at a first facility within a time span; and
      determining a weighted average demand quantity for the at least one aircraft part, the weighted average demand quantity based on the total demand quantity and a number of the incoming flights that demanded the at least one aircraft part, wherein the particular dispatch reliability rate is based on the weighted average demand quantity;
   comparing the particular dispatch reliability rate to a dispatch reliability rate threshold to generate comparison data;
   determining to adjust a stock level of the at least one aircraft part at the first facility based on the comparison data; and
   generating a command to instruct a transport system to move a quantity of the at least one aircraft part between the first facility and a second facility to adjust the stock level of the at least one aircraft part at the first facility.

2. The automated method of claim 1, wherein moving the quantity of the at least one aircraft part comprises:
   moving the quantity of the at least one aircraft part from the first facility to the second facility in response to a determination that the comparison data indicates the particular dispatch reliability rate satisfies the dispatch reliability rate threshold.

3. The automated method of claim 1, wherein moving the quantity of the at least one aircraft part comprises:
   moving the quantity of the at least one aircraft part from the second facility to the first facility in response to a determination that the comparison data indicates the particular dispatch reliability rate fails to satisfy the dispatch reliability rate threshold.

4. The automated method of claim 1, further comprising determining a fill rate associated with the at least one aircraft part at the first facility, wherein the particular dispatch reliability rate is based on the fill rate.

5. The automated method of claim 4, wherein determining the particular dispatch reliability rate further comprises:
   estimating a fraction of incoming flights projected to demand the at least one aircraft part based on the total demand quantity, the weighted average demand quantity, and the total number of incoming flights; and
   determining the particular dispatch reliability rate based on the fraction and the fill rate.

6. The automated method of claim 5, further comprising:
   determining a change in fill rate associated with the at least one aircraft part based on the fill rate and a second fill rate associated with the at least one aircraft part, the second fill rate based on a different demand than the fill rate;
   identifying, based on the change in the fill rate, a particular aircraft part of the group of aircraft parts that has a greatest impact to a dispatch reliability rate associated with the group of aircraft parts; and
   moving the particular aircraft part between the first facility and the second facility to increase a likelihood that the dispatch reliability rate associated with the group of aircraft parts is in compliance with a target dispatch reliability rate.

7. The automated method of claim 6, further comprising:
   determining a change in the particular dispatch reliability rate associated with the at least one aircraft part based on the dispatch reliability rate associated with the group of aircraft parts, the change in fill rate, and the fill rate; and
   identifying, based on the change in the dispatch reliability rate associated with the group of aircraft parts, the particular aircraft part that has the greatest impact to the dispatch reliability rate associated with the group of aircraft parts.

8. The automated method of claim 7, further comprising:
   determining the dispatch reliability rate associated with the group of aircraft parts based at least on the particular dispatch reliability rate associated with the at least one aircraft part and a second dispatch reliability rate associated with a second aircraft part.

9. The automated method of claim 8, further comprising:
   determining an impact to the dispatch reliability rate associated with the group of aircraft parts based on the change in the particular dispatch reliability rate; and
   identifying, based on the impact to the dispatch reliability rate associated with the group of aircraft parts, the particular aircraft part that has the greatest impact to the dispatch reliability rate.

10. The automated method of claim 1, further comprising identifying a particular aircraft part, from the group of aircraft parts, to move based on a highest part shortage rate.

11. The automated method of claim 1, wherein the weighted average demand quantity is a ratio of the total demand quantity and the number of the incoming flights that demanded the at least one aircraft part.

12. The automated method of claim 11, wherein the total demand quantity is greater than the number of the incoming flights that demanded the at least one aircraft part, and wherein the ratio corresponds to the total demand quantity over the number of the incoming flights that demanded the at least one aircraft part.

13. A computer-readable storage device storing instructions that, when executed by a processor, cause the processor to perform operations comprising:
determining, at a dispatch reliability apparatus, a particular dispatch reliability rate associated with at least one aircraft part of a group of aircraft parts, determining the particular dispatch reliability rate comprising:
determining a total demand quantity for the at least one aircraft part for a total number of incoming flights that have previously arrived at a first facility within a time span; and
determining a weighted average demand quantity for the at least one aircraft part, the weighted average demand quantity based on the total demand quantity and a number of the incoming flights that demanded the at least one aircraft part, wherein the particular dispatch reliability rate is based on the weighted average demand quantity;
comparing the particular dispatch reliability rate to a dispatch reliability rate threshold to generate comparison data;
determining to adjust a stock level of the at least one aircraft part at the first facility based on the comparison data; and
generating a command to instruct a transport system to move a quantity of the at least one aircraft part between the first facility and a second facility to adjust the stock level of the at least one aircraft part at the first facility.

14. The computer-readable storage device of claim 13, wherein the time span comprises one year.

15. The computer-readable storage device of claim 13, wherein movement of the quantity of the at least one aircraft part comprises:
moving the quantity of the at least one aircraft part from the second facility to the first facility in response to a determination that the comparison data indicates the particular dispatch reliability rate fails to satisfy the dispatch reliability rate threshold.

16. The computer-readable storage device of claim 13, wherein the operations further comprise determining a fill rate associated with the at least one aircraft part at the first facility, wherein the particular dispatch reliability rate is based on the fill rate.

17. The computer-readable storage device of claim 16, wherein determining the particular dispatch reliability rate further comprises:
estimating a fraction of incoming flights projected to demand the at least one aircraft part based on the total demand quantity, the weighted average demand quantity, and the total number of incoming flights; and
determining the particular dispatch reliability rate based on the fraction and the fill rate.

18. The computer-readable storage device of claim 17, wherein the operations further comprise:
determining a change in fill rate associated with the at least one aircraft part based on the fill rate and a second fill rate associated with the at least one aircraft part, the second fill rate based on a different demand than the fill rate;
identifying, based on the change in the fill rate, a particular aircraft part of the group of aircraft parts that has a greatest impact to a dispatch reliability rate associated with the group of aircraft parts; and
moving the particular aircraft part between the first facility and the second facility to increase a likelihood that the dispatch reliability rate associated with the group of aircraft parts is in compliance with a target dispatch reliability rate.

19. The computer-readable storage device of claim 18, wherein the operations further comprise:
determining a change in the particular dispatch reliability rate associated with the at least one aircraft part based on the dispatch reliability rate associated with the group of aircraft parts, the change in fill rate, and the fill rate; and
identifying, based on the change in the dispatch reliability rate associated with the group of aircraft parts, the particular aircraft part that has the greatest impact to the dispatch reliability rate associated with the group of aircraft parts.

20. The computer-readable storage device of claim 19, wherein the operations further comprise:
determining the dispatch reliability rate associated with the group of aircraft parts based at least on the particular dispatch reliability rate associated with the at least one aircraft part and a second dispatch reliability rate associated with a second aircraft part.

* * * * *